(12) United States Patent
Garcia Lopez et al.

(10) Patent No.: US 8,192,160 B2
(45) Date of Patent: Jun. 5, 2012

(54) WIND TURBINE HAVING VARIABLE HEIGHT AND METHOD FOR OPERATING THE SAME

(75) Inventors: Francisco Garcia Lopez, Roxos Santiago de Compostela (ES); Eugenio Yegro Segovia, Madrid (ES); Pedro Luis Benito Santiago, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/873,378

(22) Filed: Sep. 1, 2010

(65) Prior Publication Data
US 2011/0140426 A1 Jun. 16, 2011

(51) Int. Cl.
*F03D 11/04* (2006.01)
(52) U.S. Cl. .......... 416/1; 416/31; 416/37; 416/41; 416/85; 416/244 R; 416/246
(58) Field of Classification Search .......... 416/1, 244 R, 416/244 A, 246, 84–86, 31, 37, 41, DIG. 6; 415/7, 213.1; 290/43–44, 54–55; 248/599, 248/622, 631; 405/205, 223.1, 224
See application file for complete search history.

(56) References Cited

U.S. PATENT DOCUMENTS

| | | | |
|---|---|---|---|
| 4,868,408 A * | 9/1989 | Hesh | 290/52 |
| 6,503,023 B2 * | 1/2003 | Huang et al. | 405/206 |
| 7,156,037 B2 * | 1/2007 | Borgen | 114/264 |
| 2004/0169376 A1 * | 9/2004 | Ruer et al. | 290/55 |

FOREIGN PATENT DOCUMENTS

| | | |
|---|---|---|
| DE | 10223314 A1 | 12/2003 |
| DE | 102007002314 A1 | 7/2008 |
| EP | 146154 A1 | 6/1985 |
| EP | 1876093 A1 | 1/2008 |
| WO | 0252150 A1 | 7/2002 |
| WO | 2006121337 A1 | 11/2006 |

OTHER PUBLICATIONS

Norsk Hydro ASK, Floating Windmills (Nov. 2, 2005), http://www.hydro.com/en/Press-room/News/Historic-news-archive/2005/November/Floating-windmills (Contains description of Hydro's floating windmill technology, with a link to the video described in the article at the bottom of the page).

Norsk Hydro ASK, Floating Windmill Positioned Off Karmøy (Nov, 9, 2005), http://www.hydro.com/en/Press-room/News/Historic-news-archive/2005/November/Floating-windmill-positioned-off-Karmoy/ (Containing description of planned demonstration plant for floating windmill).

Sway A/S, Changing the Future of Wind Power, http://www/sway.no (last visited Jan. 6, 2011)(Contains flash video outlining Sway's technology).

* cited by examiner

*Primary Examiner* — Christopher Verdier
(74) *Attorney, Agent, or Firm* — Global Patent Operation; Douglas D. Zhang

(57) ABSTRACT

A wind turbine includes a rotor having a hub and at least one rotor blade, wherein the operating height of the hub is adjustable. Further, a method for operating a wind turbine is provided, which includes varying the height of the wind turbine.

18 Claims, 4 Drawing Sheets

WIND TURBINE HAVING VARIABLE HEIGHT AND METHOD FOR OPERATING THE SAME

BACKGROUND OF THE INVENTION

The present disclosure relates to wind turbines. More particularly, it relates to wind turbines with an increased average power output.

Due to limited availability of suitable areas for wind turbines on land, the concept of off-shore wind energy production has gained importance in recent years. In shallow costal waters, wind turbines are usually mounted on concrete foundations on the bed of the body of water, whereas in deeper waters, the turbines may float in the water, and may be fixed via chains, cables, lines or moorings to the bed of the body of water, for instance to the sea bed or the ground of a lake.

Operators of devices located at sea, or more generally in waters, face some problems not encountered on land. One of these factors is the presence of swell, respectively waves, which may affect the operational safety if they exceed certain amplitudes, especially in mooring-mounted wind turbines. On the other hand, the wind force often exceeds the limit at which the wind turbine has its maximum power output. If the wind speed increases beyond this level, the wind turbine power output does not increase any more. Instead, in order to avoid overload of the system, the pitch angle of the rotor blades is typically reduced by the operator or automatically. This leads to decreasing aerodynamic properties of the rotor and thus to a reduced electrical power output of the wind turbine. Hence, above a certain wind speed, the electrical power output is not increasing with wind speed, but decreasing, which is undesirable.

Further, it is known that wind speed increases, up to a certain altitude, with the distance from the ground or the sea. A higher wind turbine thus principally results in a higher average electrical power output (AEP) during wind speeds in a regime sufficiently far removed from the wind speed at maximum power output. However, off-shore wind turbines must also withstand rough weather conditions. The higher a turbine, the higher are also forces which have to be accounted for by constructional measures, which leads to the undesirable increase of costs. At the same time, if the wind turbine is higher, the average time during which the wind speed exceeds the above-mentioned maximum power level of the turbine also increases. Thus, the gain in power output by the increased height is partly compensated by the fact that the wind turbine will on average also run with lower efficiency for a longer time, caused by elongated periods with wind speeds exceeding the speed at which the turbine reaches its nominal power level.

In light of the above, it is desirable to have a wind turbine, particularly, but not necessarily for off-shore use, which takes advantage of an increased height, but at the same time avoids the known disadvantages of an increased height.

BRIEF DESCRIPTION OF THE INVENTION

In one aspect, a wind turbine is provided. The wind turbine comprises a rotor having a hub and at least one rotor blade, wherein the operating height of the hub is adjustable.

In another aspect, the wind turbine has a variable operating height.

In yet another aspect, a method for operating a wind turbine is provided, which includes varying the height of the wind turbine.

Further advantages, features, aspects and details are apparent from the dependent claims, the description and drawings.

Embodiments are also directed at apparatuses for carrying out the disclosed methods and including apparatus parts for performing each described method step. These method steps may be performed by way of hardware components, a computer programmed by appropriate software, by any combination of the two or in any other manner. Furthermore, embodiments according to the invention are also directed at methods by which the described apparatus operates. It includes method steps for carrying out every function of the apparatus.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

In the following, the term "ground level" is defined as follows. If a wind turbine is floating in a body of water, the ground level is defined as the level of the surface of the water when no waves are present. Tidal processes like the change between high tide and low tide may change the ground level. In this respect, an operating height of a hub or rotor hub, and hence also of the wind turbine, is defined as the difference in height between the center of mass of the rotor hub and the ground level. If the turbine is located on land, the ground level is defined to be at an average height calculated from four measurement points. These are measured each at locations where the wind turbine tower meets the plane of the surrounding terrain in a northern, western, southern and eastern direction. The term "operating height" of a wind turbine hub, respectively of the wind turbine itself, is defined to be the height of the hub with respect to the ground level.

Figure 1:
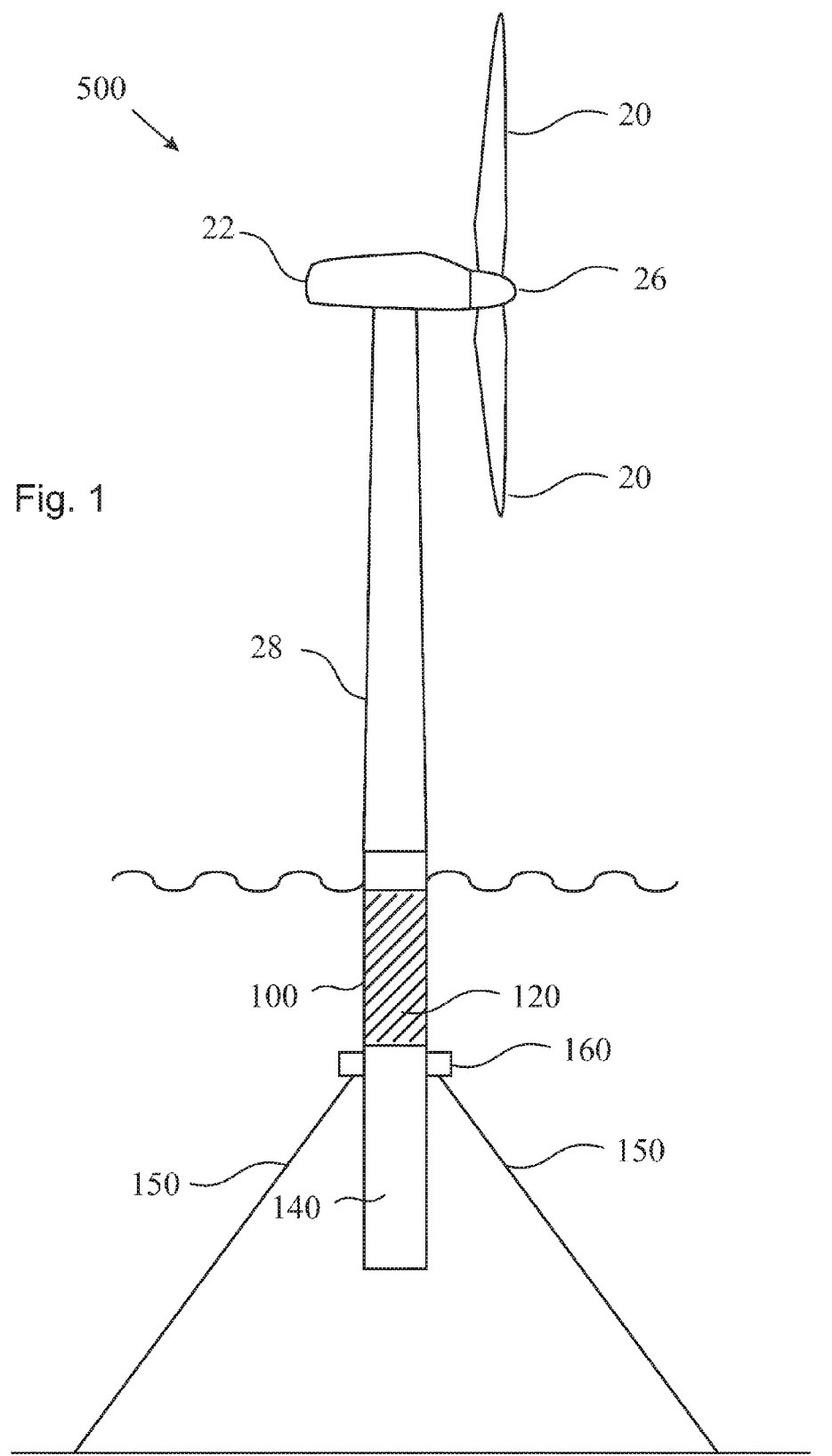
FIG. 1 shows a schematic side view of an off-shore wind turbine according to an embodiment.

FIG. 1 shows a schematic side view of an embodiment of a wind turbine 500. It includes a tower 28, a nacelle 22 housing the generator and electrical equipment, and a hub 26 connected to the two or more rotor blades 20. It further includes a water deposit 100 for water 120.

In an embodiment, the wind turbine is connected to the bed of the body of water by at least one cable or chain 150, typically by a plurality of chains, cables or lines, the latter also called moorings in the nautical context. In the following non-limiting examples, it is exemplarily referred to as cables. These fixation elements are typically connected to the bed of the body of water by anchor elements or heavy structures.

Suitable technical means for this purpose are well known in the art. The cables are mounted to the tower 28 of the wind turbine. In an embodiment, the length of the cables may be varied by at least one winch 160. In other embodiments, the tower may also be connected to the bed of the body of water via a foundation. In this case, an element between the lower section of tower 28 and the foundation on the bed of the body of water should provide for variable length, to enable movement of the wind turbine in case the buoyancy of the turbine is changed and the height of the turbine above the level of the surrounding water is changing.

In order to vary the buoyancy of the floating wind turbine, water 120 may be added to the deposit 100 or be removed from the deposit. When varying the buoyancy, the wind turbine 500 will sink deeper into the water, or will rise. The length of the cables is typically synchronously varied during a change of the buoyancy, in order to keep the force on the cables in a defined range. As the tension of the cables is one factor for the stability of the wind turbine, this task should be given attention. Ways to implement a control for the tension of one or more cables/chains/moorings 150 by appropriately controlling one or more winches 160, or in other manners, are within the knowledge of the skilled person.

Figures 2A, 2B:
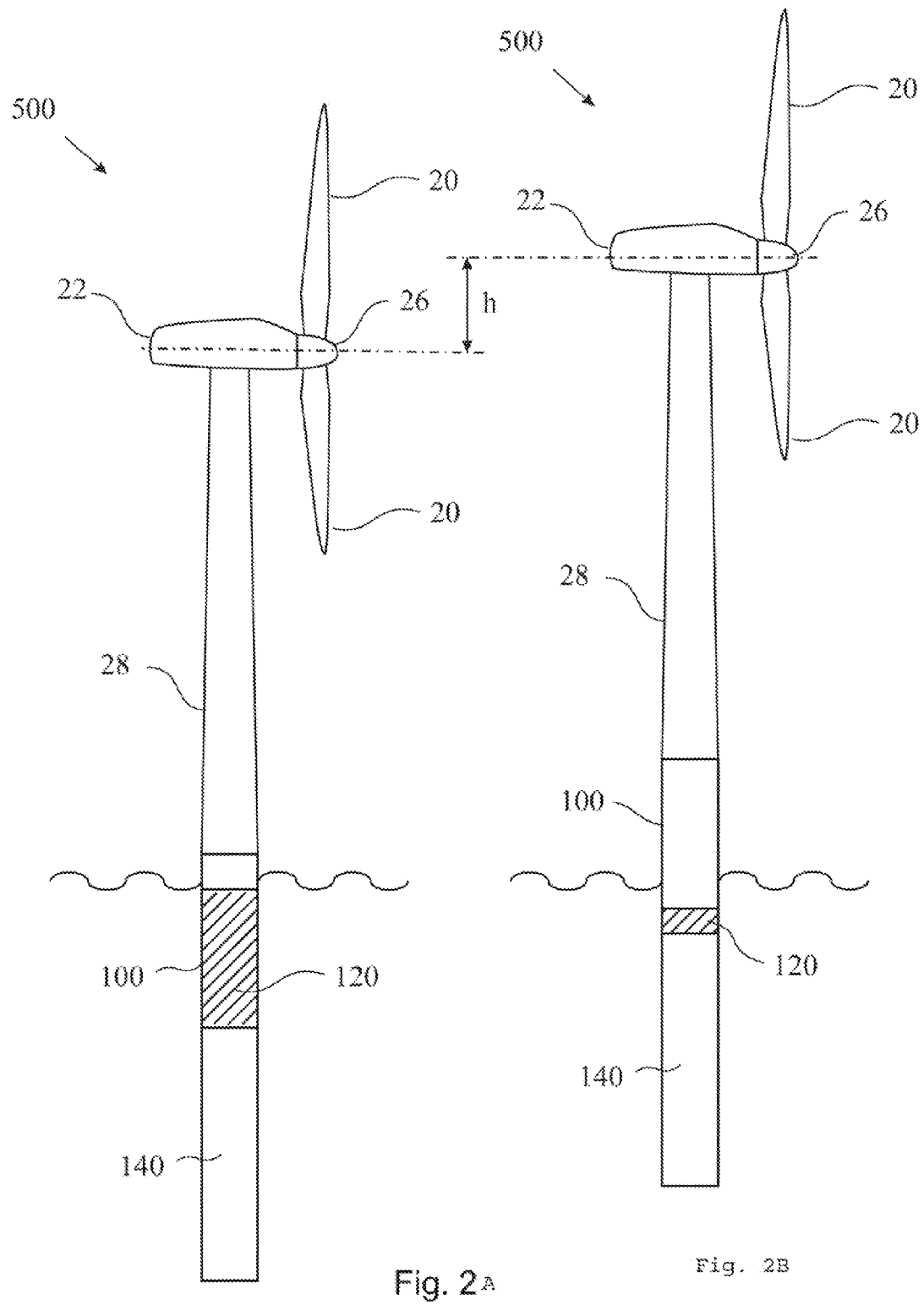
FIG. 2A and FIG. 2B show (collectively referred to as FIG. 2) schematic side views of a wind turbine according to an embodiment in two different operational states.

FIG. 2 shows the wind turbine of FIG. 1 in two different modes, on the left with an almost filled deposit 100, on the right with an almost empty deposit. The cables and winches are, for illustrational purposes, not depicted. The height difference h results from the different buoyancy of the wind turbine in the different modes or operational states. Hence, by adjusting the buoyancy of the wind turbine by adding water to or removing water from the deposit, the operating height of the rotor of the wind turbine can be adjusted, respectively controlled.

Figure 3:
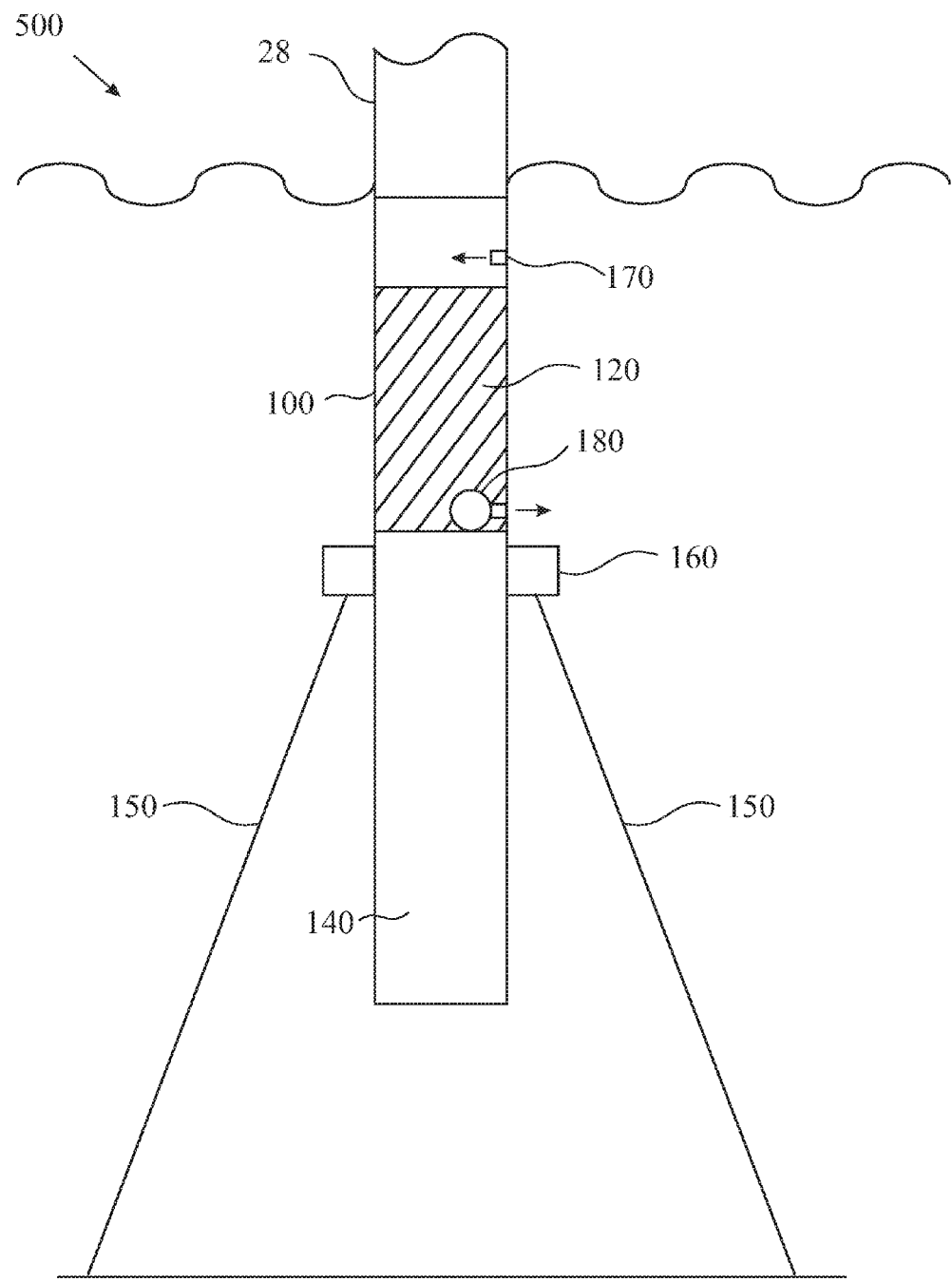
FIG. 3 shows a schematic sectional view of an embodiment of a wind turbine.

FIG. 3 shows a detailed sectional view of the water deposit section of an embodiment of the wind turbine 500. Water deposit 100 may be evacuated from water 120 by at least one pump 180, which is adapted to pump the water 120 into the body of water in which the turbine is floating. Typically, pump 180 is an electrical pump, but may also be a hydraulic pump. In an embodiment, the pump is provided to be able to substantially entirely fill or empty the deposit within a time span of from 3 to 20 minutes, more typically from 5 to 15 minutes. As the time intervals during which significant changes of wind speed or swell occur are typically in a higher time regime, this interval is typically sufficiently short. Calculations for designing the pump and valve system are within the knowledge of the skilled person.

In an embodiment, the wind turbine has a ballast section 140 on its lower end below the water deposit 100. The ballast serves for providing stability against tilting of the floating wind turbine. The ballast may typically be from 30 tons to 100 tons, depending on the overall size of the wind turbine and its design. The water deposit 100 and ballast section may both or any one of them be integrated into the lower part of wind turbine tower 28. They may also, both combined in one element or any one of them separated, be provided as additional elements mounted to the lower end of tower 28.

In an embodiment, at least one switchable valve 170 is provided to allow water 120 to stream from the body of water in which the turbine floats into deposit 100 when opened. For safety reasons, the valve may be provided to be automatically opened in case of a failure of the pump system, or in case of general power failure. In this case, the deposit may be flooded and the overall height of the wind turbine above the level of the water in which it floats will decrease, which is desirable for safety reasons laid out below.

In another embodiment, removing the water from the deposit may also be possible passively by just opening a valve. In this case, deposit 100 is typically provided such that the water level in any filling condition lies substantially above the level of the water in which the turbine floats, so that water may be caused to flow out through a valve by the influence of gravity. In this case, pump 180 is typically configured to be able to pump water into the deposit 100.

The following mode of operation is typical for an embodiment of a wind turbine as laid out above. One aspect of the adjustable height of the wind turbine is, that the operating height of the turbine, i.e. the rotor, may be adapted to different wind conditions and/or swell conditions.

During low wind conditions, it is desirable to have a higher operational height of the turbine, as it is known that wind speed increases with height. Thus, by emptying the deposit 100, the buoyancy of the wind turbine 500 is increased, and likewise, the height of the rotor above the ground increases. The increase in wind speed then leads to a higher average electrical power output. The increase of the AEP is even bigger than the increase in wind speed, as the gain of AEP is on average about 3/2 of the increase in wind speed. The wind speed below which conditions are regarded as low wind conditions is typically a wind speed of about 12 m/s. Depending on the characteristics of the wind turbine, also other wind speeds may be regarded as suitable boundary values, e.g., from 7 m/s to 15 m/s, more typically from 9 to 13 m/s.

For high wind conditions, water 120 is filled into deposit 100. In an embodiment, the water flows passively into the deposit by gravity through a valve 170. In another embodiment, the water is pumped into the deposit 100 via a pump 180. With rising water level and thus decreasing buoyancy, the wind turbine gradually sinks into the water. Thus, the height of the rotor above the level of the surrounding water, in which the turbine floats, is decreasing. This is desirable for the following reasons. At a certain wind speed, e.g. at 25 m/s, the wind turbine typically reaches its nominal (maximum) power output, which is determined by constructional parameters. If the wind becomes even stronger, the wind turbine cannot produce more energy, but the pitch of the rotor blades is typically reduced automatically in order to avoid an overload of the system. The modification of the pitch angle leads to decreasing aerodynamic properties of the rotor, which leads a smaller effectiveness. Thus, the rotor can transform the wind energy to rotational energy at a lower rate. As a result, with further increasing wind speed, the electrical power output of the turbine goes down. Hence, it is desirable in wind speeds exceeding the wind speed at which the turbine reaches its maximum power output, to have a lower height of the rotor, as the wind decreases with smaller distance to the ground. A wind speed above which conditions are regarded as high wind conditions is typically a wind speed of about 20 m/s. Depending on the characteristics of the wind turbine, also other values may be regarded as suitable boundary values, e.g. wind speeds from 16 m/s to 30 m/s, more typically from 18 to 26 m/s.

Additionally, the height of the wind turbine may be adapted in dependency of the height of the waves or swell. When the average height of the waves exceeds a certain boundary value, i.e. under high swell conditions, the height of the turbine is reduced for safety reasons as described herein. The boundary value above which the swell is regarded as high depends strongly on the type and dimensions of the wind turbine, and of the properties of its fixation to the bed of the body of water. Depending thereon, the boundary value may be from an average wave height of 4 m up to 16 m, more typically from 6 m to 13 m. In an embodiment, a gradual reduction of the turbine height with growing wave height is provided. Ways of implementing such a mechanism and the control algorithm are within the knowledge of a skilled person.

When there are high wind conditions and the wind turbine has a lower height due to a filled deposit, the wind speed affecting the rotor is reduced in comparison to the bigger height with an empty deposit. Thus, the wind speed is typically in the range of the wind speed for maximum power output, but the load on the turbine is lower and the electrical power output is higher due to the higher efficiency of the rotor caused by a higher pitch angle.

In a non-limiting example, an off-shore wind turbine has a nominal power of 2.5 Megawatt, which is reached at a wind speed of 20 m/s. The wind turbine weighs, with an empty water deposit, about 200 tons. The height of the hub, above the level of the surrounding water in which the turbine floats, is about 70 m with an empty deposit. The deposit may have a volume of 40 m³. In this case, the height difference between the turbine with full deposit and the turbine with empty deposit is about 1/7 of the height of the hub above the level of the surrounding water. For such a wind turbine having a height difference h of 10 m, an increase in average power output over time of 2.5 percent was calculated, taking into account typical operating conditions of an off-shore wind turbine and typical weather conditions. For a height difference h of 30 m, a gain in average power output of 7 percent was calculated.

In an embodiment, the wind turbine is designed such that the height difference h between the wind turbine (500) with a filled deposit (100) and the wind turbine with an empty deposit is, related to the height of the hub (26) above the level of the surrounding water with a full deposit, from about 5 percent to about 40 percent, more typically from 10 percent to 20 percent. Full deposit in this respect means, that the deposit is filled up to the maximum water level defined during design of the wind turbine or defined as a maximum level by the operator. Empty deposit is defined as the deposit having the lowest water level achievable by employing the measures provided to empty the deposit. In a wind turbine according to an embodiment, the height difference may be from about 5 m to about 50 m, more typically from 8 m to 20 m, strongly depending on the overall dimensions of the wind turbine. The volume of the deposit may, also depending on the size of the wind turbine, be from about 10 m³ to about 100 m³, more typically from 20 to 70 m³.

In an embodiment, the wind turbine may be constructed such that, in case of a power failure or a malfunction of the pump system, the deposit is automatically filled with water in order to provide for a low operating height, meaning that the forces exerted on the turbine by wind and waves are minimized. The turbine may then be shut down or operate in curtail power mode.

In another embodiment, the system including the deposit and pump, respectively valve, serves as a dynamic damper or active damper for the movement of the wind turbine, by dynamically adding and removing water to and from the deposit.

Figure 4:
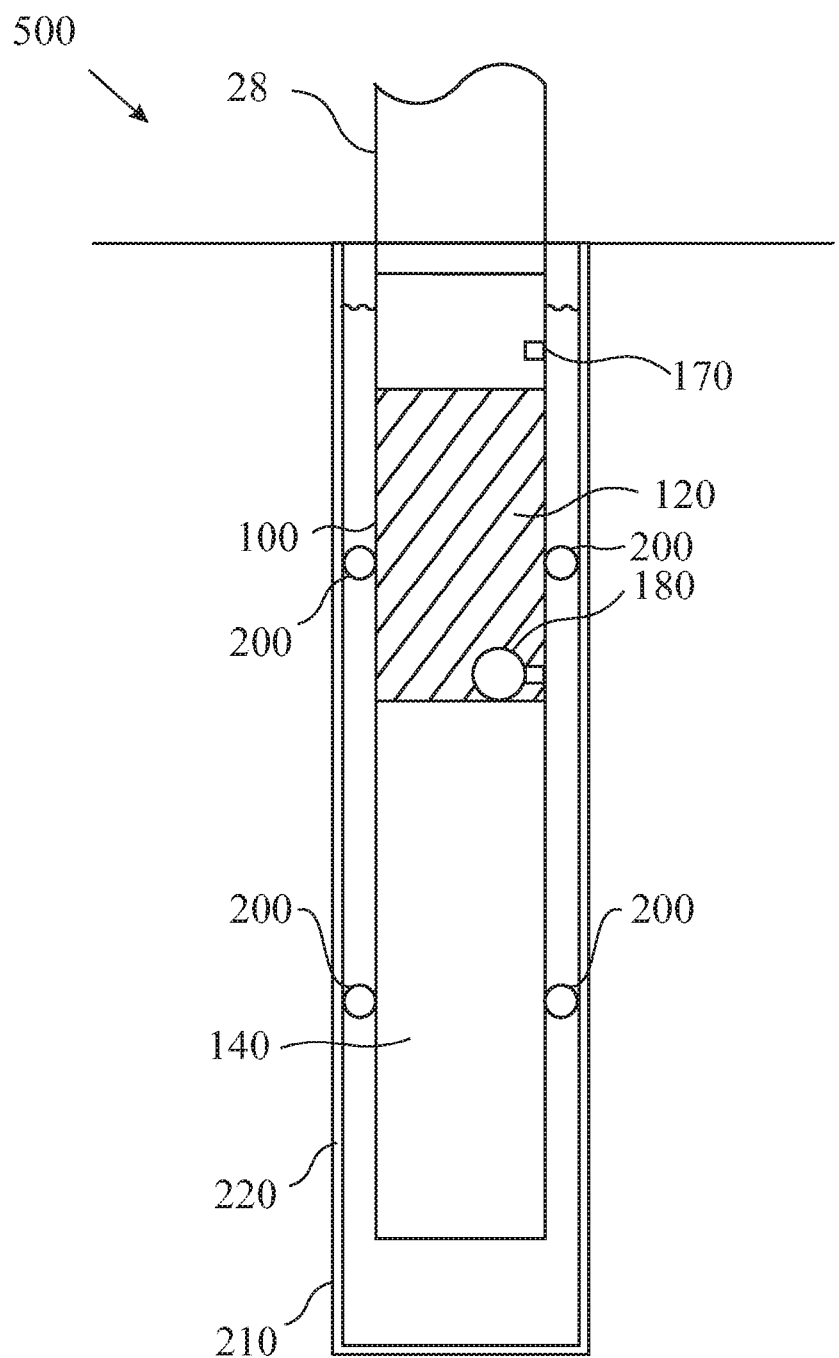
FIG. 4 shows a schematic sectional view of a further embodiment of a wind turbine.

FIG. 4 shows a further embodiment, wherein the concept of variable height, taking advantage of the buoyancy of a wind turbine, is applied to a turbine on land. For this purpose, the water in which the turbine floats is the water in a dump or pit (210), typically with a round shape like in a well. Water at least partially fills the dump or pit (210). The pit has typically concrete walls (220) and bottom and is filled with water up to a certain height. The turbine (500) according to this embodiment is substantially similar to those depicted in FIGS. 1, 2, and 3. The typically circular concrete (220) walls have, in a non-limiting example, an inner diameter of approximately 4 m, but also diameters from 2 m to 7 m are suitable, more typically from 3 m to 6 m. The depth is dependent on the overall height of the turbine, and may vary from 10 m to 40 m, more typically from 15 m to 30 m. To vary the height of the wind turbine, the water level in the deposit (100) is varied by pumping water from the amount in the pit (210) into the deposit or vice versa. No fixation elements like cables are necessary in this embodiment. Instead, the forces exerted by the wind on the turbine are transmitted from the turbine tower to the walls of the pit typically by guiding elements like vertical rails mounted to the tower or the walls of the pit. In an embodiment, a plurality of steel rollers (200) are provided in the wall of the pit in various heights, preferably three rollers for each height, which are provided with a 120 degree offset angle with respect to each other in a horizontal plane. In the figure, the rollers (200) are shown only schematically for illustrational purposes and are not provided in the 120 degree arrangement as described.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine comprising:
   a rotor comprising a hub and at least one rotor blade,
   wherein the operating height of the hub is adjusted in a non-tilting way by changing a buoyancy of the wind turbine depending on external operating conditions of the wind turbine.

2. The wind turbine of claim 1, further comprising a water deposit.

3. The wind turbine of claim 1, further comprising a ballast section.

4. The wind turbine of claim 2, further comprising at least one pump adapted to change a water level in the deposit.

5. The wind turbine of claim 2, further comprising at least one valve, wherein water streams into the deposit when the at least one valve is open.

6. The wind turbine of claim 2, wherein the operating height difference of the hub between the wind turbine having a filled deposit and the wind turbine having an empty deposit is, related to the height of the hub above a level of a surrounding body of water in which the turbine floats, from about 5 percent to about 40 percent of the height with a filled deposit.

7. The wind turbine of claim 2, wherein the operating height difference between the wind turbine having a filled deposit and the wind turbine having an empty deposit is from about 5 m to about 50 m.

8. The wind turbine of claim 2, wherein the volume of the deposit is from about 10 m³ to about 100 m³.

9. The wind turbine of claim 1, wherein the wind turbine is fixed to a bed of a body of water via at least one of a cable, a chain, and a line.

10. The wind turbine of claim 9, further comprising at least one winch adapted to pull the at least one element.

11. The wind turbine of claim 1, wherein a lower section of a tower of the wind turbine is located in an at least partly water-filled pit in the ground.

12. A method for operating a wind turbine, comprising:
adjusting the height of the wind turbine in a non-tilting way by varying a buoyancy of the wind turbine depending on external operating conditions of the wind turbine.

13. The method of claim 12, wherein the external operating conditions comprise at least one of wind speed, and swell.

14. The method of claim 12, wherein varying the buoyancy of the wind turbine is carried out via varying a water level in a deposit of the wind turbine.

15. The method of claim 12, wherein varying the buoyancy of the wind turbine comprises filling water in a deposit of the wind turbine for operation during high wind conditions, and taking water out of the deposit for operation during low wind conditions.

16. The method of claim 12, wherein varying the buoyancy of the wind turbine comprises filling water in a deposit of the wind turbine for operation during high swell conditions, and removing water out of the deposit for operation during low swell conditions.

17. The method of claim 15, wherein the high wind conditions are defined as a wind speed above about 20 ml/s, and the low wind conditions are defined as a wind speed below about 12 m/s.

18. The method according to claim 12, wherein varying the buoyancy of the wind turbine comprises damping movements of the wind turbine by dynamically varying water level in a deposit of the wind turbine.

* * * * *

UNITED STATES PATENT AND TRADEMARK OFFICE
CERTIFICATE OF CORRECTION

PATENT NO.       : 8,192,160 B2                          Page 1 of 1
APPLICATION NO.  : 12/873378
DATED            : June 5, 2012
INVENTOR(S)      : Francisco Garcia Lopez et al.

It is certified that error appears in the above-identified patent and that said Letters Patent is hereby corrected as shown below:

In Column 4, Line 29, delete "thewater" and insert -- the water --, therefor.

In Column 8, Line 10, in Claim 17, delete "ml/s," and insert -- m/s, --, therefor.

Signed and Sealed this
Thirteenth Day of November, 2012

David J. Kappos
*Director of the United States Patent and Trademark Office*